(12) United States Patent
Quartarone

(10) Patent No.: US 8,053,057 B2
(45) Date of Patent: Nov. 8, 2011

(54) MATERIAL WITH IMPROVED ADHESION SURFACE

(75) Inventor: James R. Quartarone, Loveland, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 133 days.

(21) Appl. No.: 12/462,659

(22) Filed: Aug. 6, 2009

(65) Prior Publication Data

US 2010/0040833 A1    Feb. 18, 2010

Related U.S. Application Data

(62) Division of application No. 11/229,424, filed on Sep. 12, 2005.

(51) Int. Cl.
     *B32B 3/30*            (2006.01)

(52) U.S. Cl. .................. 428/141; 428/156; 428/161

(58) Field of Classification Search .................. 428/141, 428/156, 161
See application file for complete search history.

(56) References Cited

U.S. PATENT DOCUMENTS

| | | | | |
|---|---|---|---|---|
| 5,639,536 | A | * | 6/1997 | Yamazaki et al. ............ 428/141 |
| 6,623,595 | B1 | * | 9/2003 | Han et al. ................... 156/345.1 |

* cited by examiner

*Primary Examiner* — William P Watkins, III
(74) *Attorney, Agent, or Firm* — James M. Kasischke; Michael P. Stanley; Jean-Paul A. Nasser

(57) ABSTRACT

An apparatus for improving and increasing sustainable shear force capabilities at an interfacing surface between a rigid material and a flexible material is disclosed. The interface includes at least two superimposed components having different surface roughnesses. A coarse surface roughness component has a surface roughness about 3 orders of magnitude greater than that of a fine surface roughness component. The interface is useful for all types of devices with a rigid-to-flexible interface that needs to resist shear, tension, torsion, compression, or any disturbing steady-state or variable force or forces.

2 Claims, 8 Drawing Sheets

— PRIOR ART —

MATERIAL WITH IMPROVED ADHESION SURFACE

This application is a divisional of pending prior U.S. patent application Ser. No. 11/229,424 filed on 12 Sep. 2005 and claims the benefit under 35 U.S.C. §121 of the prior application's filing date.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a method of improving and increasing sustainable shear force capabilities at an interfacing surface between a rigid material and a flexible material.

(2) Description of the Prior Art

It is well known to utilize a resilient bushing having a pair of concentric rigid, typically metal sleeves. FIG. 1 is a prior art example of a typical fastening arrangement 10 utilizing adhesion at rigid-to-flexible interfacing surfaces. The inner sleeve 13 is secured to one structural component 15 (for example an input shaft) while the outer sleeve 18 is secured to another structural component 20 (for example a propeller shaft). An annular elastomeric insert 23 is concentrically positioned between the rigid sleeves 13, 18. The interface between the interfacing surfaces needs to transmit high shear and torque loads. Previous designs would fail locally in shear due the high torque applied during the functional application, and due to the comparatively low shear which these devices could sustain. Higher torque, shear, adhesion was needed at the rigid-to-flexible material interfaces. The adhesion resistance to shear failure at the surface interface 25 and 27 is what supports the full torque during operation.

In the past, most interfacing surfaces 25 and 27 were relatively smooth; that is, their surface roughness was generally less than 170 RMS as measured by SAE Standard J448a. A method of increasing adhesion resistance to shear failure was the addition of a phosphate coating of various thicknesses. However, the surface roughness did not exceed roughly 170 RMS.

A method and apparatus for improving resistance to adhesion failure between two interfacing surfaces utilizing by producing a particular shape and roughness is disclosed. The present invention utilizes both coarse and fine surface roughness producing techniques. The surface, to be treated, has a coarse (large scale) surface roughness component on the order of about three to four orders of magnitude greater than the fine (small scale) surface roughness component. The invention uses a plurality of superimposed roughnesses rather than one range of roughness, as seen in prior art. The appropriate surfaces of the rigid part are roughened (e.g., by machining, casting, molding, sandblasting) to yield surfaces having both small (fine) and large (coarse) scale roughness components. The large-scale roughness component is about three orders of magnitude greater than the small scale roughness component.

The object of this invention is to improve and increase sustainable shear force capabilities at an interfacing surface between a rigid material (for example: a structural metal) and a flexible material (for example: an elastomeric dampening material).

Another object of the present invention is to improve and increase the sustainable shear force capabilities at an interfacing surface without internal or external fastening devices such as bolts, screws, washers, and the like.

Yet another object of the present invention is to improve and increase the sustainable shear force capabilities at an interfacing surface in a smaller, more compact volume than previous methods.

Yet another object of the present invention is to improve and increase the sustainable shear force capabilities at an interfacing surface with a simplistic (that is without a large number of parts) and economy.

SUMMARY OF THE INVENTION

A method and apparatus for improving resistance to adhesion failure between two interfacing surfaces utilizing by producing a particular shape and roughness is disclosed. The present invention utilizes both coarse and fine surface roughness producing techniques. The surface, to be treated, has a coarse (large scale) surface roughness component on the order of about three to four orders of magnitude greater than the fine (small scale) surface roughness component. The invention uses a plurality of superimposed roughnesses rather than one range of roughness, as seen in prior art. The appropriate surfaces of the rigid part are roughened (e.g., by machining, casting, molding, soundblasting) to yield surfaces having both small (fine) and large (coarse) scale roughness components. The large-scale roughness component is about three orders of magnitude greater than the small scale roughness component.

BRIEF DESCRIPTION OF THE DRAWINGS

These and other features and advantages of the present invention will be better understood in view of the following description of the invention taken together with the drawings wherein.

DETAILED DESCRIPTION OF THE INVENTION

Figure 1:
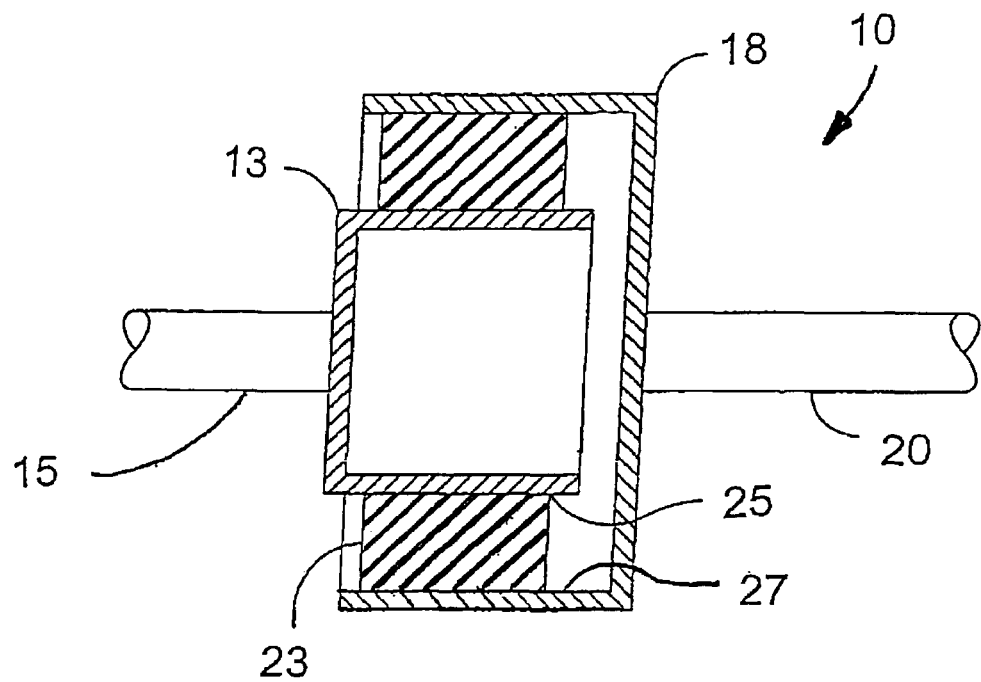
FIG. 1 is a cross-section of a prior art bushing.
Figure 2:
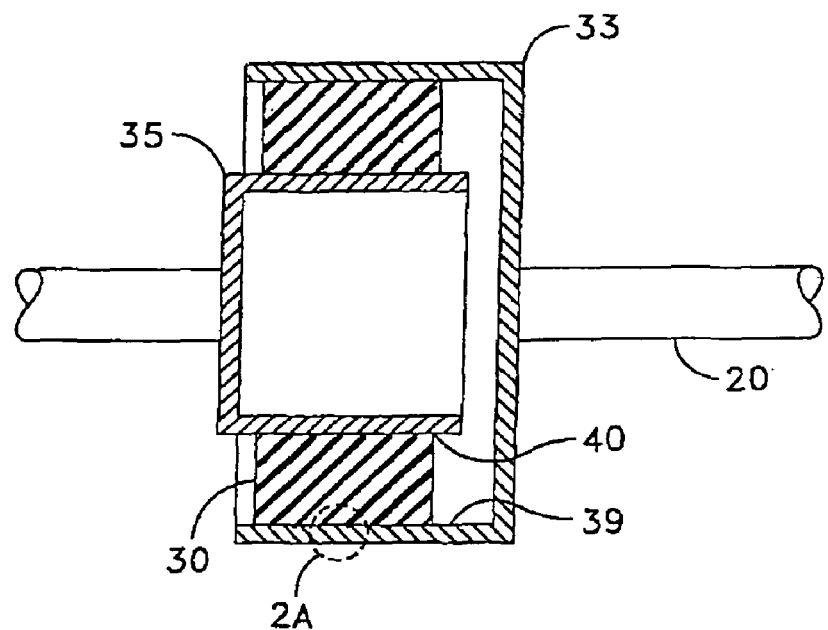
FIG. 2 is a cross-section of one embodiment of the present invention shown as a bushing.
Figure 2A:
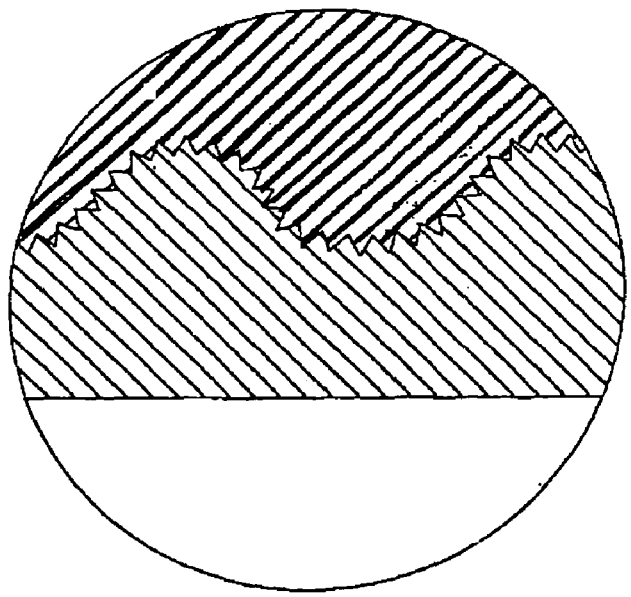
FIG. 2A is an enlarged detail of a zone of an interface between a rigid member and an elastomeric member circumscribed by phantom lines 2A, FIG. 2.
Figure 3:
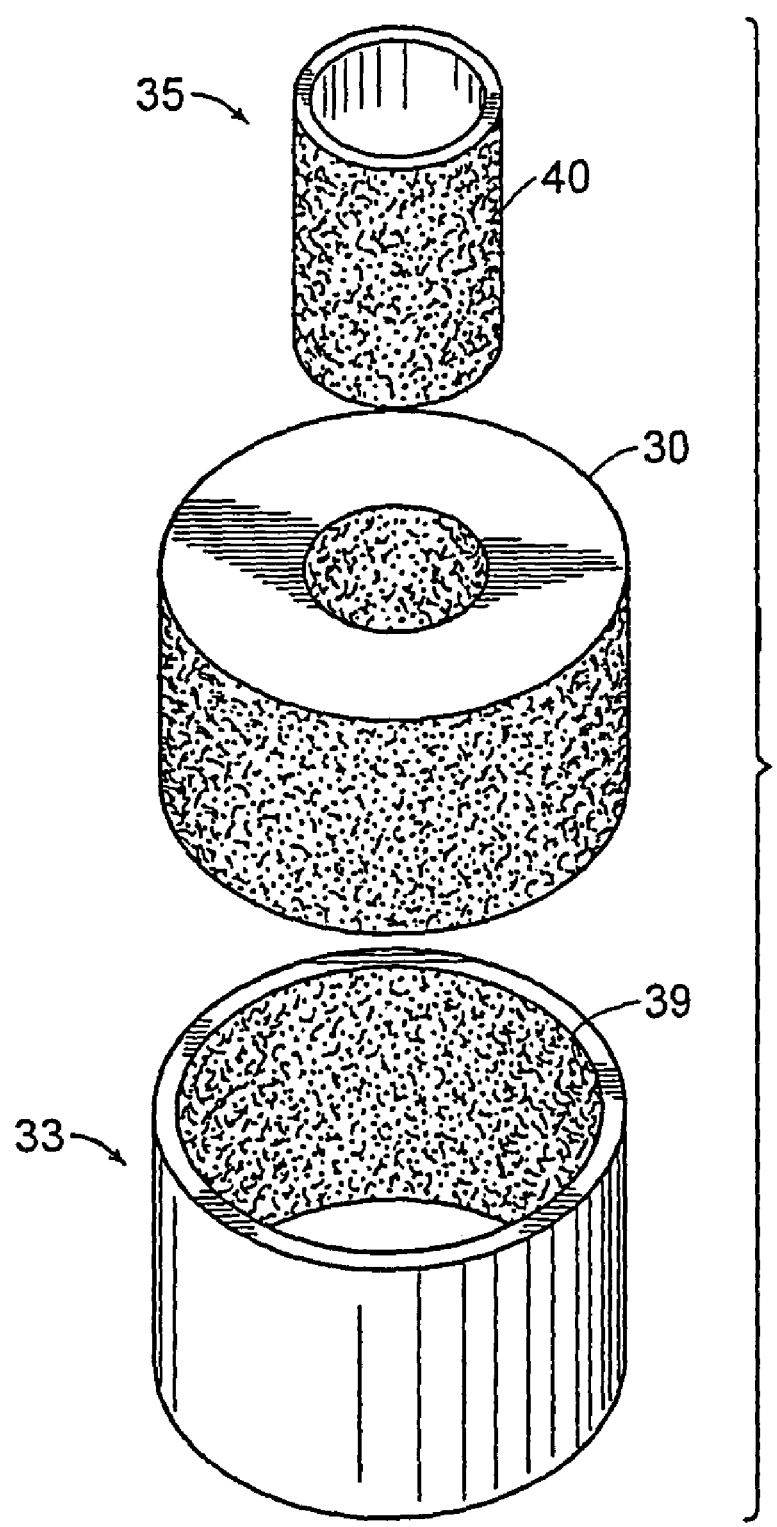
FIG. 3 is an exploded perspective view of a portion on FIG. 2.

Referring to FIGS. 2 and 3, one embodiment of a bushing 10' according to the present invention is shown utilizing a generally an elastomeric material 30, an outer rigid member 33, and an inner rigid member 35. The elastomeric material 30 can be any well-known elastomeric material and would be selected based upon the desired dampening and isolation properties, all of which is well within the knowledge of those skilled in the art. The elastomeric material is moldingly bonded to the rigid member 33, 35 at confronting interfacing surfaces 39, 40.

In a preferred embodiment, a 50 durometer fluorosilicone elastomer was used. However, 40, 50, 60, and 70 durometer elastomers have also been tested. It should be stressed, however, that the choice of the elastomeric material 30 will depend on the circumstances of its intended use and is not limited in any way to these stated durometer values or to fluorosilicone elastomers.

The inner and outer rigid members 33 and 35 may also be selected from any material. The material chosen will again depend upon the circumstances in which it is intended to be used. Typically, the inner and outer rigid members 33 and 35 are made from metal (e.g., aluminum); however, the material can be any material having the necessary rigidity such as steel, plastic, laminates, composites, ceramics, biological material (bones, teeth, tusks), etc. Optionally, the inner and outer rigid members 35 and 33 may be anodized. The decision to anodize the inner and outer rigid members 35 and 33 will depend on a combination of the material chosen and the operating conditions.

The inner rigid member 35 has an outer surface 40 while the outer rigid member 33 has an inner surface 39. The outer surface 40 and the inner surface 39 are machined, or otherwise created, to have a coarse surface roughness component. In one preferred embodiment, the coarse surface roughness component was created first, using a standard industrial milling machine, and the fine roughness component was produced afterwards, by sandblasting. The outer surface 40 and/or inner surface 39 are sandblasted or otherwise created using standard industrial techniques.

Most typically, the dual coarse-fine roughness is produced on the rigid material surface by two separate operations; e.g., a machining operation followed by a blasting operation. However, alternatively, both course and fine roughness components may be produced at the same time; e.g., by a casting operating for metals, or by a molding operation for rigid plastics. This invention uses a plurality of roughness components working cooperatively. In one embodiment, the coarse roughness component was created using a milling operation. In another embodiment, the coarse roughness component was created using an elox operation. In one embodiment, the fine roughness component was created by grit blasting with aluminum oxide.

The coarse roughness component would generally be within the range of 50,000 to 1,000,000 micro-inches. Coarse roughness components may center around any coarse roughness (e.g., 50,000, 200,000, etc.) within this 50,000 to 1,000,000 micro-inch range. The fine roughness component would generally be within the range of 100 to 2,000 micro-inches. Fine roughness components may center around any fine roughness (e.g., 200, 550, 1,000, etc.) within this 100 to 2,000 micro-inch range. In one particular successful embodiment, a fine roughness component of 550 micro-inches was specified with a tolerance of ±150 micro-inches producing an actual measured fine roughness component between 400 to 700 micro-inches.

The coarse roughness component is three orders of magnitude greater than the fine roughness component; i.e., the ratio of coarse roughness component to fine roughness component will, in one embodiment, be 1,000. Examples of various embodiments of this invention, which demonstrate the relationship between the coarse roughness component and the fine roughness component, are presented.

Figure 4A:
FIGS. 4A and 4B, respectively, are elevation views of the relative scales of the fine and coarse roughnesses shown separately.
Figure 4B:
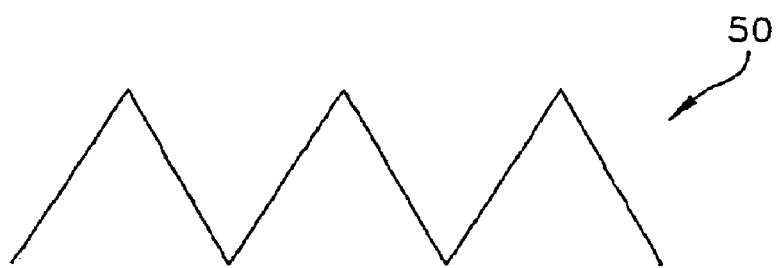

The outer surface 40 and/or inner surface 39 are characterized by having surface roughness components that include both coarse 50, (large scale), FIG. 4B, and fine 51 (small scale), FIG. 4A roughness surfaces relative to each other. It should be noted that any surface which needs to improve and increase sustainable adhesives force capabilities at an interfacing surface where a flexible material confronts a rigid material could utilize the present invention.

Figure 5:
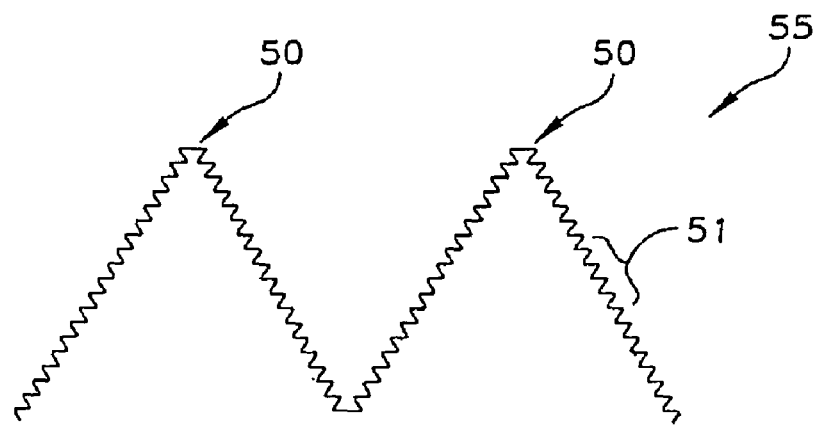
FIG. 5 is an elevation view of one embodiment of the present invention showing the coarse and fine surface roughness components combined.

FIG. 5 shows one embodiment 55 of this combination of coarse 50 and fine 51 surface roughness. While the entire coarse roughness surface 50 is shown in combination with the fine roughness surface 51, the coarse roughness surface 50 may optionally contain only smaller or partial regions having the fine roughness surface 51, and also regions of the fine roughness surface 51 may optionally contain no coarse roughness component (e.g., near end regions of the interfacing surfaces).

The coarse surface roughness component 50 is of the order of three orders of magnitude greater than the roughness of the fine surface roughness component 51. In a preferred embodiment, coarse surface 50 has a surface roughness component of about 200,000 micro inches and a fine surface 51 roughness component has a surface roughness of about 500 micro inches.

In another embodiment, a coarse surface 50 roughness of 300,000 micro-inches and a fine surface 51 roughness of 200 micro-inches was used. The interface 55 having both coarse 50 and fine 51 surface roughness components allows the interface to sustain greater shear and other forces than surfaces having only fine or coarse roughness surfaces.

Figure 6:
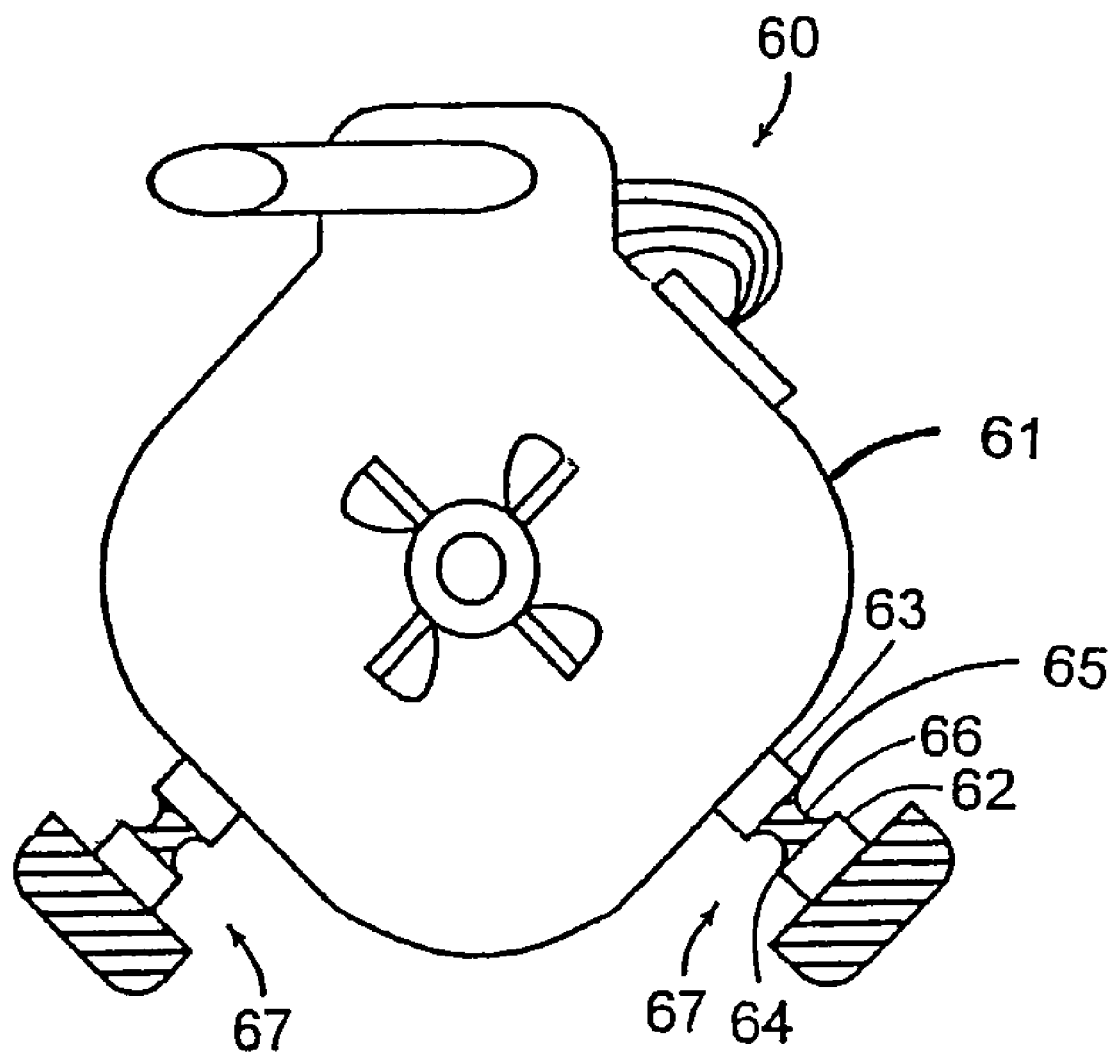
FIG. 6 is a front view of an engine incorporating engine mounts utilizing the present invention.
Figure 7:
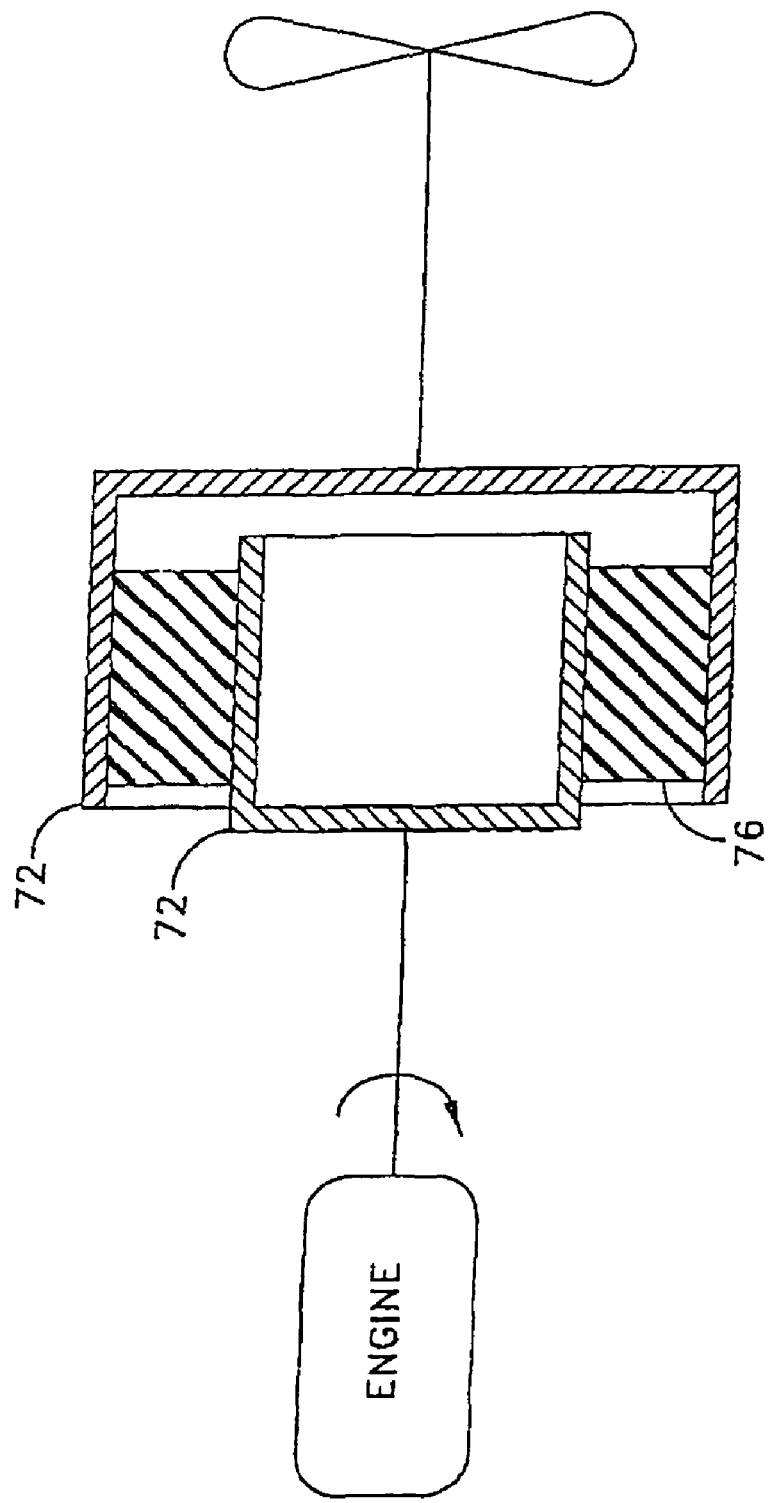
FIG. 7 is a plan view of the present invention used with a marine/aeronautical application.

The coarse and fine surface 55 can be applied to any device with a rigid-to-flexible interface that needs to resist shear, tension, torsion, compression, or any disturbing steady-state or variable force or forces. The coarse and fine surface 55 could be used on virtually any type of anti-shock, vibration, or noise mount; e.g., automobile engine mounts (FIG. 6) or marine/aeronautical propeller shaft applications (FIG. 7). FIG. 6 mounted engine assembly 60 shows engine 61 mounted on engine mounts 67, supported on frame structure 68. Rigid material 62 and 63 have coarse-fine surfaces 55 applied to interface 64 and 65. Flexible material 66 has been sandwiched and moldingly bonded between rigid materials 62 and 63 (i.e., bonded at interfaces 64 and 65).

Figure 9A:
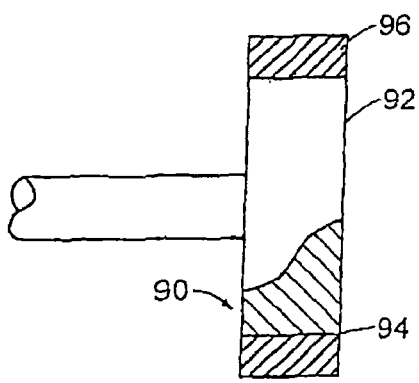
FIG. 9A is partially a side view and partially a sectional view of an elastomeric tread wheel.
Figure 9B:
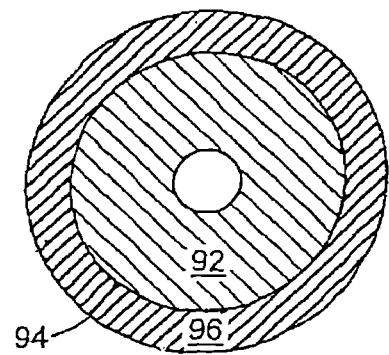
FIG. 9B is an end view of this wheel.

FIGS. 9A and 9B depict an elastomeric treaded wheel 90 showing elastomeric material 96 moldingly bonded to a circular rigid material wheel rim 92, at confronting interfacing surface 94.

Figure 8A:
FIGS. 8A-8I are elevation views showing different surface configurations of the present invention.
Figure 8B:
Figure 8C:

FIGS. 8A-8I show some of the different possible shapes of surface roughness 81-89. For purposes of the present invention, the surface roughness can be any suitable shape. Graphically portrayed shapes 81, 83, 85, and 87, FIGS. 8A, 8C, 8E and 8G depict simple sine-wave or approximate sine-wave shapes as the shape of the coarse surface 50 in addition to the saw-tooth shape 82 as shown in FIGS. 4A-B and 5. FIG. 8B shows a mix of coarse 50 and fine 51 surface roughness. The difference in magnitude between the coarse 50 and fine 51 surface roughness is so large that the fine 51 surface roughness cannot be readily visually detected in FIG. 8B. However, the other views, FIGS. 5, 8D, 8F, and 8H, show both coarse and fine components.

Figure 8D:
Figure 8E:
Figure 8F:
Figure 8G:
Figure 8H:
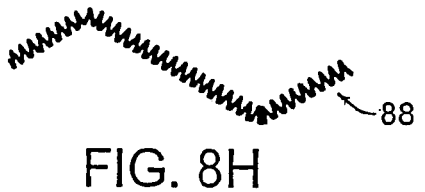
Figure 8I:
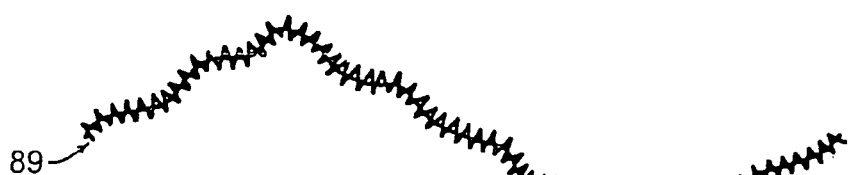

FIG. 8D shows one embodiment 84 wherein a rough saw-tooth fine roughness 51 is superimposed on a coarse sine-wave surface roughness 50. Shape 86, FIG. 8F shows a slightly larger and more random fine surface roughness 51 saw-tooth profile superimposed on a coarse sine-wave roughness 50. Shape 88, FIG. 8H shows yet another embodiment wherein a slightly random fine roughness 51 saw-tooth profile is superimposed on a fairly regular coarse roughness 50 saw-tooth shape. Lastly, shape 89, FIG. 8I shows an embodiment utilizing at least three combinations of surface roughness. This combination is referred to as a fine-mid-coarse blend. Generally, the mid-surface roughness component would be 20-200 times greater than the fine surface roughness component, and the coarse surface roughness component would be 20-200 times greater than the mid-surface roughness component. In one embodiment, the fine surface roughness component is approximately 200 RMS micro-inches, the "mid" surface roughness component is approximately 4,000 RMS micro-inches, and the coarse surface roughness component is approximately 80,000 RMS micro-inches. In another embodiment of a fine-mid-coarse roughness combination, the "fine" surface roughness is approximately 150 RMS micro-inches, the "mid" surface roughness is approximately 7,500 RMS micro-inches, and the "coarse" surface roughness is approximately 375,000 RMS micro-inches.

Rigid components 62, 72, 72a would be designed using well-known engineering criteria for design and performance and would be manufactured using any suitable standard art. Flexible material 30, 66, 76, would be selected using well-known engineering criteria for required characteristics (e.g., damping, strength, durometer value, shock, and vibration properties) and would be manufactured using any suitable molding process which leaves or encourages the desired resilient properties and facilitates bonding to interfacing surfaces 64. It would be advantageous, as with any molding process, to pay attention to eliminating voids (e.g., gas, air bubbles) and contaminants (e.g., dirt, grease) at the interface 64. As with standard methods, proper surface preparation is advised. It should be noted that an interface with this improved method of bonding geometry will be stronger than other methods at all levels of cleanliness.

In light of the above, it is therefore understood that within the scope of the appended claims, the invention may be practiced otherwise than as specifically described.

What is claimed is:

1. A rigid material capable of interface with a generally flexible material, said material comprising:
    at least one surface with said at least one surface having a first component with a relatively coarse surface roughness and a second component with a relatively fine surface roughness;
    wherein said at least one surface is capable of interfacing with and moldingly bonding to said flexible material;
    wherein said relatively coarse surface roughness component is 1500 times larger than said relatively fine surface roughness component;
    wherein said relatively coarse surface roughness component includes a shape which approximates a saw-tooth; and
    wherein said relatively fine surface roughness component includes a shape which approximates a saw-tooth.

2. A rigid material capable of interface with a generally flexible material, said material comprising:
    at least one surface with said at least one surface having a first component with a relatively coarse surface roughness and a second component with a relatively fine surface roughness;
    wherein said at least one surface is capable of interfacing with and moldingly bonding to said flexible material;
    wherein said relatively coarse surface roughness component is 1500 times larger than said relatively fine surface roughness component;
    wherein said relatively coarse surface roughness component includes a shape which approximates a sine-wave; and
    wherein said relatively fine surface roughness component includes a shape which approximates a saw tooth.

* * * * *